United States Patent
Georgeson et al.

(10) Patent No.: US 9,443,300 B2
(45) Date of Patent: Sep. 13, 2016

(54) SYSTEMS AND METHODS FOR ANALYZING A BONDLINE

(71) Applicant: THE BOEING COMPANY, Huntington Beach, CA (US)

(72) Inventors: Gary E. Georgeson, Tacoma, WA (US); Anish Poudel, Carbondale, IL (US); Tsuchin Chu, Carbondale, IL (US); James A. Grossnickle, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 145 days.

(21) Appl. No.: 14/486,461

(22) Filed: Sep. 15, 2014

(65) Prior Publication Data

US 2016/0078607 A1  Mar. 17, 2016

(51) Int. Cl.
  *G06T 7/00* (2006.01)

(52) U.S. Cl.
  CPC ............ *G06T 7/001* (2013.01); *G06T 7/0008* (2013.01); *G06T 2207/30108* (2013.01)

(58) Field of Classification Search
  None
  See application file for complete search history.

(56) References Cited

U.S. PATENT DOCUMENTS

| | | | | |
|---|---|---|---|---|
| 2013/0018809 A1* | 1/2013 | Li | ...................... | G06Q 30/018 705/317 |
| 2013/0128026 A1* | 5/2013 | Hirose | ............... | G01N 21/8903 348/125 |
| 2014/0098936 A1 | 4/2014 | Grossnickle et al. | | |
| 2014/0160279 A1 | 6/2014 | Grossnickle et al. | | |
| 2015/0215584 A1* | 7/2015 | Tapia | ................. | G01N 21/8851 348/125 |
| 2015/0253266 A1* | 9/2015 | Lucon | .................... | G01N 25/72 374/4 |
| 2015/0319418 A1* | 11/2015 | Yahav | .................... | G03B 15/00 348/50 |
| 2015/0323424 A1* | 11/2015 | Browne | ............. | G01M 99/008 73/865.9 |

FOREIGN PATENT DOCUMENTS

CA  2823296 A1  4/2014

OTHER PUBLICATIONS

Digital Imaging Techniques in Experimental Stress Analysis. Peters et al. 1982.*
Testing of Structural Joints. Stanley S. Smeltzer III. Dec. 2010.*
(Continued)

*Primary Examiner* — Delomia L Gilliard
(74) *Attorney, Agent, or Firm* — Armstrong Teasdale LLP (57) ABSTRACT

A method for analyzing a bondline in a structure is provided. The method includes obtaining, from a first side of the structure, by at least one computing device, at least one first internal image of the structure that includes at least a first pattern associated with the bondline, wherein the structure is in a pre-loaded state and obtaining, from the first side of the structure, by the at least one computing device, at least one second internal image of the structure that includes at least the first pattern, wherein the structure is in a loaded state. Additionally, the method includes comparing, by the at least one computing device, the at least one first internal image with the at least one second internal image, and determining, by the at least one computing device, at least one stress and/or strain-related property of the bondline based on the comparison. The method additionally includes predicting an estimated life of the bondline, whereby the estimated life provides a valuable tool for optimization of maintenance effort and enabling cost-optimal maintenance decisions.

20 Claims, 6 Drawing Sheets

(56) References Cited

OTHER PUBLICATIONS

Peters, W.H. et al., 1982, "Digital Imaging Techniques in Experimental Stress Analysis," Optical Engineering, 21(3), pp. 427-431.

Peters, W.H. et al., 1983, "Application of Digital Correlation Methods to Rigid Body Mechanics," Optical Engineering, 22(6), pp. 738-742.

Chu, T.C. et al., 1985, "Applications of Digital Image Correlation Techniques to Experimental Mechanics," Experimental Mechanics, 25(3), pp. 232-244.

Sutton, M.A. et al., 1986, "Application of an Optimized Digital Correlation Method to Planar Deformation Analysis," Image and Vision Computing, 4(3), pp. 143-150.

Bruck, H.A. et al., 1989, "Digital Image Correlation Using Newton-Raphson Method of Partial Differential Correction," Experimental Mechanics, 29(3), pp. 261-267.

Kahnjetter, Z. L et al., 1990, "3-Dimensional Displacement Measurements Using Digital Image Correlation and Photogrammic Analysis," Experimental Mechanics, 30(1), pp. 10-16.

Luo, P.F. et al., 1993, "Accurate Measurement of 3-Dimensional Deformations in Deformable and Rigid Bodies Using Computer Vision," Experimental Mechanics, 33(2), pp. 123-132.

Helm, J. D. et al., 1996, "Improved three-dimensional image correlation for surface displacement measurement," Optical Engineering, 35(7), pp. 1911-1920.

\* cited by examiner

SYSTEMS AND METHODS FOR ANALYZING A BONDLINE

BACKGROUND

The present disclosure relates generally to analyzing composite/bonded structures by using hybrid non-destructive evaluation (NDE) and digital image correlation (DIC) techniques, and more specifically to analyzing properties of a bondline inside a structure, and predicting their life during service, thus, giving the owners a valuable tool for optimization of the maintenance effort and allowing them to make cost-optimal maintenance decisions.

At least some known systems for analyzing changes in a structure prior to and during loading involve applying random (visual) patterns to a surface of the structure, imaging the pattern prior to loading, imaging the pattern during loading, and correlating (i.e., comparing) images to determine an amount of deformation or displacement in the pattern. Such systems do not enable analysis of components or features that are not visible on the surface of the structure. Accordingly, hidden features, such as a bondline within a composite structure, cannot be analyzed using such techniques/systems.

Other known systems analyze changes in a structure using X-rays. Accordingly, such systems are capable of detecting responses to loads (e.g., mechanical and/or thermal loads) within the structure. However, such systems require two separate sources of X-rays, two separate detectors, and access to opposite sides of the structure. Such limitations make analyzing internal features of the structure impractical in many situations, including during manufacturing of the structure and when the structure is in service.

Accordingly, it would be beneficial to have systems that are capable of non-destructively analyzing load responses of features within a structure in instances where access to opposite sides of the structure is not readily available.

BRIEF DESCRIPTION

In one aspect, a method for analyzing a bondline in a structure is provided. The method is implemented by at least one computing device. The method includes obtaining, from a first side of the structure, by the at least one computing device, at least one first internal image of the structure that includes at least a first pattern associated with the bondline, wherein the structure is in a pre-loaded state. The method additionally includes obtaining, from the first side of the structure, by the at least one computing device, at least one second internal image of the structure that includes at least the first pattern, wherein the structure is in a loaded state. Additionally, the method includes comparing, by the at least one computing device, the at least one first internal image with the at least one second internal image. Additionally, the method includes determining, by the at least one computing device, at least one stress and/or strain-related property of the bondline based on the comparison. Additionally, the method includes predicting an estimated life of the bondline, whereby the estimated life provides a valuable tool for optimization of maintenance effort and enabling cost-optimal maintenance decisions.

In another aspect, a computing device for use in analyzing a bondline in a structure is provided. The computing device is configured to obtain, from a first side of the structure, at least one first internal image of the structure that includes at least a first pattern associated with the bondline, wherein the structure is in a pre-loaded state. The computing device is additionally configured to obtain, from the first side of the structure, at least one second internal image of the structure that includes at least the first pattern, wherein the structure is in a loaded state. Additionally, the computing device is configured to compare the at least one first internal image with the at least one second internal image and determine at least one stress and/or strain-related property of the bondline based on the comparison.

In another aspect, a computer-readable storage medium having computer-executable instructions embodied thereon for configuring a computing device to analyze a bondline in a structure is provided. When executed by the computing device, the computer-executable instructions cause the computing device to obtain, from a first side of the structure, at least one first internal image of the structure that includes at least a first pattern associated with the bondline, wherein the structure is in a pre-loaded state. The computer-executable instructions additionally cause the computing device to obtain, from the first side of the structure, at least one second internal image of the structure that includes at least the first pattern, wherein the structure is in a loaded state. The computer-executable instructions additionally cause the computing device to compare the at least one first internal image with the at least one second internal image and determine at least one stress and/or strain-related property of the bondline based on the comparison.

DETAILED DESCRIPTION

Figure 1:
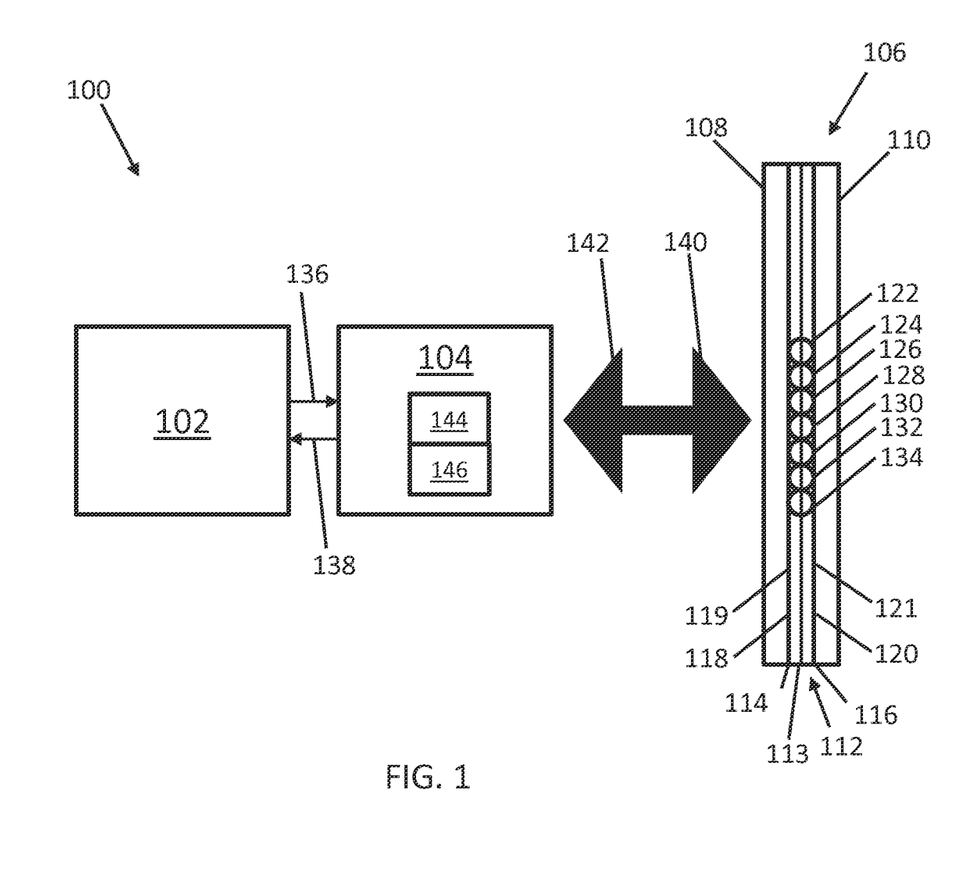
FIG. 1 is a diagram of an example environment in which an analysis computing device coupled to an imaging device analyzes a bondline in a structure.

FIG. 1 is a diagram of an example environment 100 in which an analysis computing device 102 coupled to an imaging device 104, such as a non-destructive evaluation (NDE) imaging device, analyzes a bondline 112 in a structure 106. In some implementations, imaging device 104 is included within analysis computing device 102. Structure 106 is a composite structure that includes a first part 108 coupled to a second part 110 by bondline 112. In at least some implementations, bondline 112 is not visible using visible light from outside of structure 106. Bondline 112 includes an adhesive 113 that is attached on a first side 114 to first part 108 and on a second side 116 to second part 110. Bondline 112 includes a first pattern 118 associated with first side 114 and a second pattern 120 associated with second side 116. In some implementations, first pattern 118 is applied to bondline 112 by a first scrim 119. In some implementations, second pattern 120 is applied to bondline 112 by a second scrim 121. In some implementations, bondline 112 includes only a single pattern, rather than two patterns. In other implementations, bondline 112 includes more than two patterns. Further, in some implementations, one or more of first pattern 118 and/or second pattern 120 are within adhesive 113, rather than on first scrim 119 and/or second scrim 121. Bondline 112 includes a plurality of locations imaged by imaging device 104. For example, bondline includes a first location 122, a second location 124, a third location 126, a fourth location 128, a fifth location 130, a sixth location 132, and a seventh location 134.

Analysis computing device 102 transmits instructions 136 to imaging device 104 to generate image data 138 of bondline 112. Imaging device 104 transmits image data 138 to analysis device in response to instructions 136. Imaging device includes at least one transmitter 144 and at least one detector 146. Transmitter 144 transmits at least one signal 140 to bondline 112 and receives at least one signal 142 from bondline 112. More specifically, in some implementations, transmitter 144 is an array of ultrasonic transmitters, signal 140 is a plurality of ultrasonic signals, and signal 142 is a plurality of reflected ultrasonic signals. In some implementations, analysis computing device 102 transmits instructions 136 to imaging device 104 to obtain image data 138 for multiple angles at one or more of locations 122, 124, 126, 128, 130, 132, and 134 along bondline 112. By obtaining image data 138 for multiple angles, analysis computing device 102 generates three-dimensional images of one or more of locations 122, 124, 126, 128, 130, 132, and 134. More specifically, analysis computing device 102 transmits instructions 136 to imaging device 104 to steer signals 140 (e.g., ultrasonic signals) using transmitter 144 (e.g., one-dimensional or two-dimensional ultrasonic array) such that each location 122, 124, 126, 128, 130, 132, and 134 receives signals 140 from at least two different angles. In other implementations, transmitter 144 is an X-ray transmitter and detector 146 is a plurality of X-ray detectors. In some implementations, signals 142 are backscattered X-ray signals that are directed in different directions and detector 146 (e.g., plurality of X-ray detectors) detects the X-rays coming from at least two different directions. Though seven locations are described above, in other implementations, imaging device 104 images a different number of locations on bondline 112. In other implementations, signals 140 and 142 are of a different type (i.e., other than acoustic or electromagnetic) and/or of a different frequency (i.e., other than ultrasonic or X-ray) than those described above.

Figure 2:
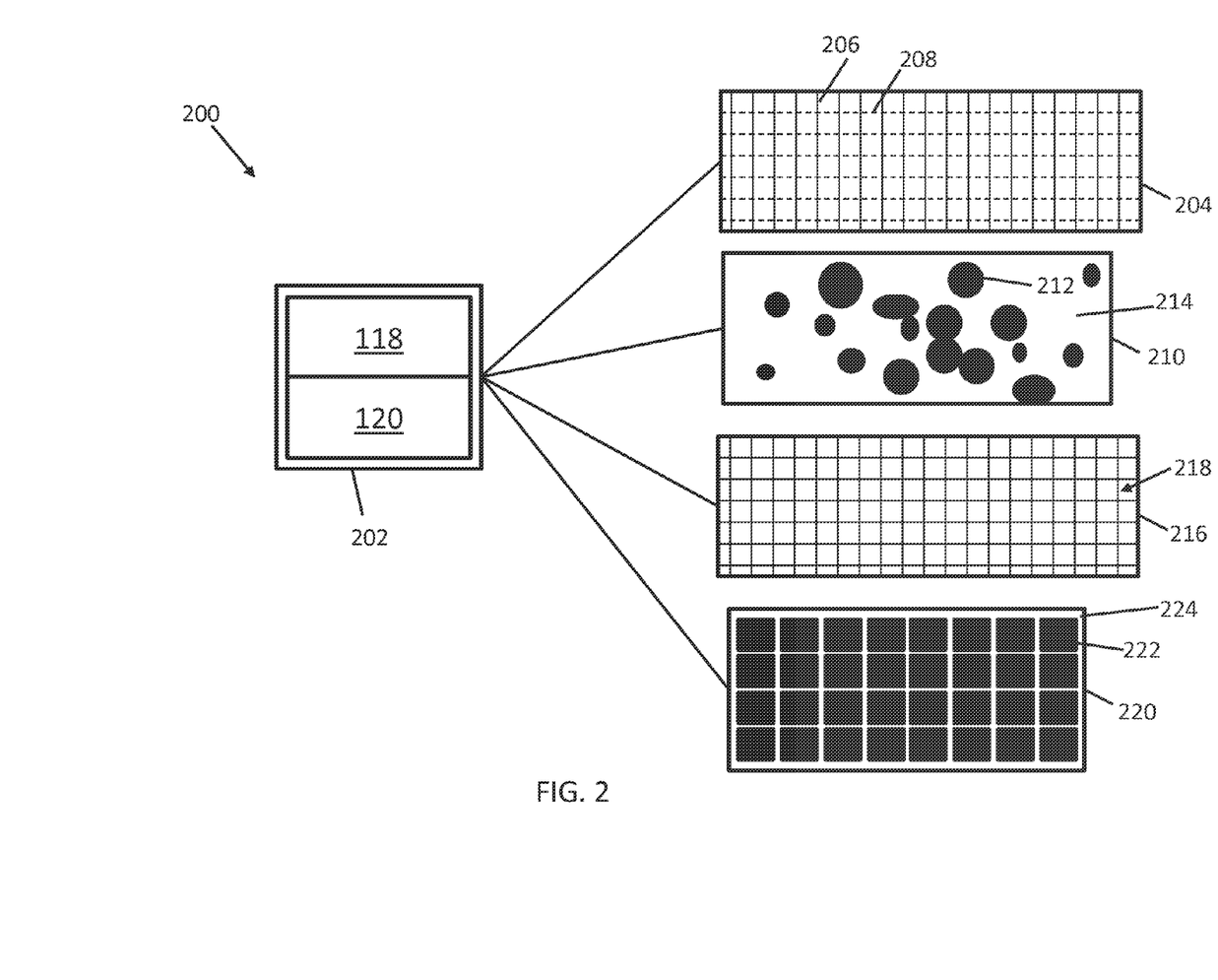
FIG. 2 is a diagram of example patterns associated with the bondline shown in FIG. 1.

FIG. 2 is a diagram 200 of example patterns 202 associated with bondline 112. More specifically, in some implementations, one or more of first pattern 118 and second pattern 120 includes at least one of first arrangement 204, second arrangement 210, third arrangement 216, and fourth arrangement 220. When imaging device 104 transmits signals 140 and receives reflected signals 142, first pattern 118 and/or second pattern 120 is included in image data 138. More specifically, materials included in or applied to bondline 112 have differing properties, such as differences in impedence, density, and/or molecular structure, that cause patterns to appear in image data 138. In at least some implementations, patterns 118 and/or 120 are not detectable using visible light. First arrangement 204 includes linear features, such as nanoparticles or fibers, having a first orientation 206 on first side 114 of bondline 112 and having a second, different orientation 208 on second side 116 of bondline 112. The difference between first orientation 206 and second orientation 208 enables first side 114 and second side 116 to be easily discernable in image data 138.

Second arrangement 210 includes speckle features 212 that are sputtered or sprayed onto a resin base 214. Speckle features 212 have a first reflectivity and resin base 214 has a second reflectivity that is different from the first reflectivity. Third arrangement 216 includes geometric features 218 that, in some implementations, is used for geometric control of bondline 112. For example, in some implementations, geometric features 218 are included in one or more polymeric scrims (e.g., first scrim 119 and/or second scrim 121). Fourth arrangement 220 includes polymeric materials 222 sprayed onto a base 224. Polymeric materials 222 have a first reflectivity (or transmissibility) and base 224 has a second reflectivity (or transmissibility) that is different from the first reflectivity. In some implementations, polymeric materials 222 and base 224 are applied to first side 114 and/or second side 116 of bondline 112. Materials included in first arrangement 204, second arrangement 210, third arrangement 216, and fourth arrangement 220 are non-metals in at least some implementations. In other implementations, one or more materials in first arrangement 204, second arrangement 210, third arrangement 216, and fourth arrangement 220 are metal.

Figure 3:
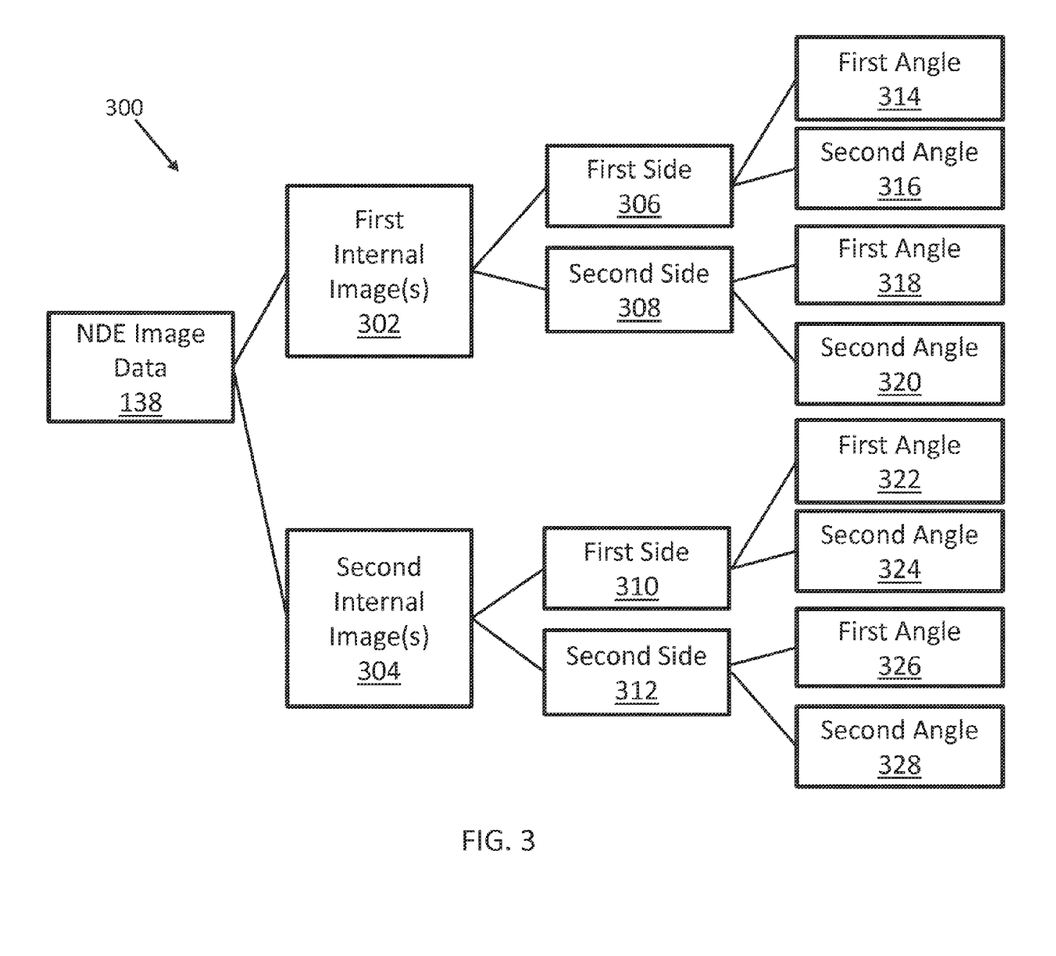
FIG. 3 is a diagram of image data generated by the imaging device shown in FIG. 1.

FIG. 3 is a diagram 300 of NDE image data 138 generated by imaging device 104. Image data 138 includes first internal images 302 associated with a pre-loaded state of structure 106 and second internal images 304 associated with a loaded state of structure 106. More specifically, prior to a mechanical load (not shown) and/or thermal load (not shown) being applied to structure 106, imaging device 104 obtains first internal images 302 of bondline 112. Once the mechanical load and/or thermal load is applied to structure 106, imaging device 104 obtains second internal images 304 of bondline 112. At least one of first pattern 118 and second pattern 120 changes from the first internal images 302 to the second internal images 304, due to stress and strain caused by the mechanical load and/or thermal load. More specifically, at least one of first pattern 118 and second pattern 120 undergoes deformation due to the stress and strain caused by the mechanical load and/or thermal load.

First internal images 302 include first side data 306 and second side data 308, corresponding to first side 114 and second side 116 of bondline 112. Additionally, first side data 306 includes first angle data 314 and second angle data 316. More specifically, first angle data 314 represents a view of first side 114 from a first angle and second angle data 316 represents a view of first side 114 from a second angle that is different from the first angle. Imaging device 104 and/or analysis device 102 calculates parallax between first angle data 314 and second angle data 316 and generates a three dimensional image of first side 114. Likewise, second side data 308 includes first angle data 318 and second angle data 320. Similarly, second internal images 304 include first side data 310, including first angle data 322 and second angle data 324, and second side data 312 includes first angle data 326 and second angle data 328 of bondline 112 when structure 106 is mechanically and/or thermally loaded. Analysis computing device 102 transmits instructions 136 to imaging device 104 to obtain image data 138 for each location 122, 124, 126, 128, 130, 132, and 134 along bondline 112. As described in more detail herein, analysis computing device 102 compares (i.e., correlates) first internal images 302 with second internal images 304. By comparing first internal images 302 with second internal images 304, analysis computing device 102 detects and measures deformations in first pattern 118 and/or second pattern 120 between the pre-loaded state and the loaded state of structure 106. Based on the comparison, analysis computing device 102 determines at least one strain-related property of bondline 112.

Figure 4:
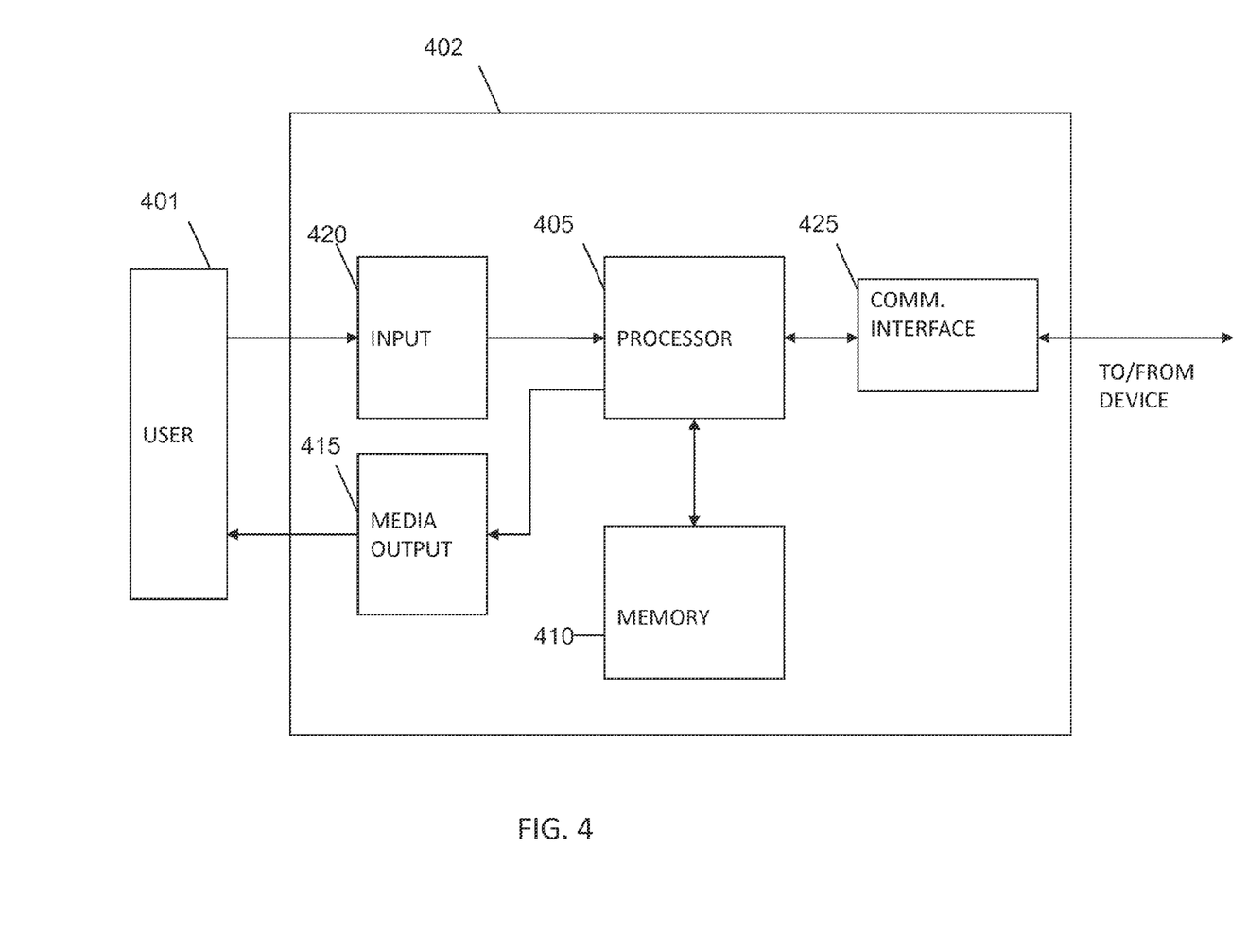
FIG. 4 is a diagram of an example computing device.

FIG. 4 is a diagram of an example computing device 402. Computing device 402 is representative of analysis computing device 102. Additionally, in at least some implementations, imaging device 104 includes one or more components of computing device 402. As described above, in some implementations, imaging device 104 is included within analysis computing device 102. Computing device 402 includes one or more processors 405 for executing instructions. In some implementations, executable instructions are stored in a memory device 410. Processor 405 may include one or more processing units (e.g., in a multi-core configuration). One or more memory devices 410 are any one or more devices allowing information such as executable instructions and/or other data to be stored and retrieved. One or more memory devices 410 may include one or more computer-readable media.

Computing device 402 also includes at least one media output component 415 for presenting information to a user 401. Media output component 415 is any component capable of conveying information to user 401. In some implementations, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some implementations, computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Computing device 402 additionally includes a communication interface 425, which is communicatively couplable to another device such as imaging device 104. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 410 are, for example, computer-readable instructions for providing a user interface to user 401 via media output component 415 and, optionally, receiving and processing input from input device 420. A user interface may include, text, graphics, and/or sound that enable user 401 to interact with computing device 402, for example to control operations of computing device 402 and/or view output based, for example, on data (e.g., image data 138) transmitted from another device (e.g., imaging device 104). In some implementations, the computer-readable instructions additionally cause computing device 402 to analyze image data 138 and determine at least one strain-related property of bondline 112 based, at least in part, on image data 138.

Figure 5:
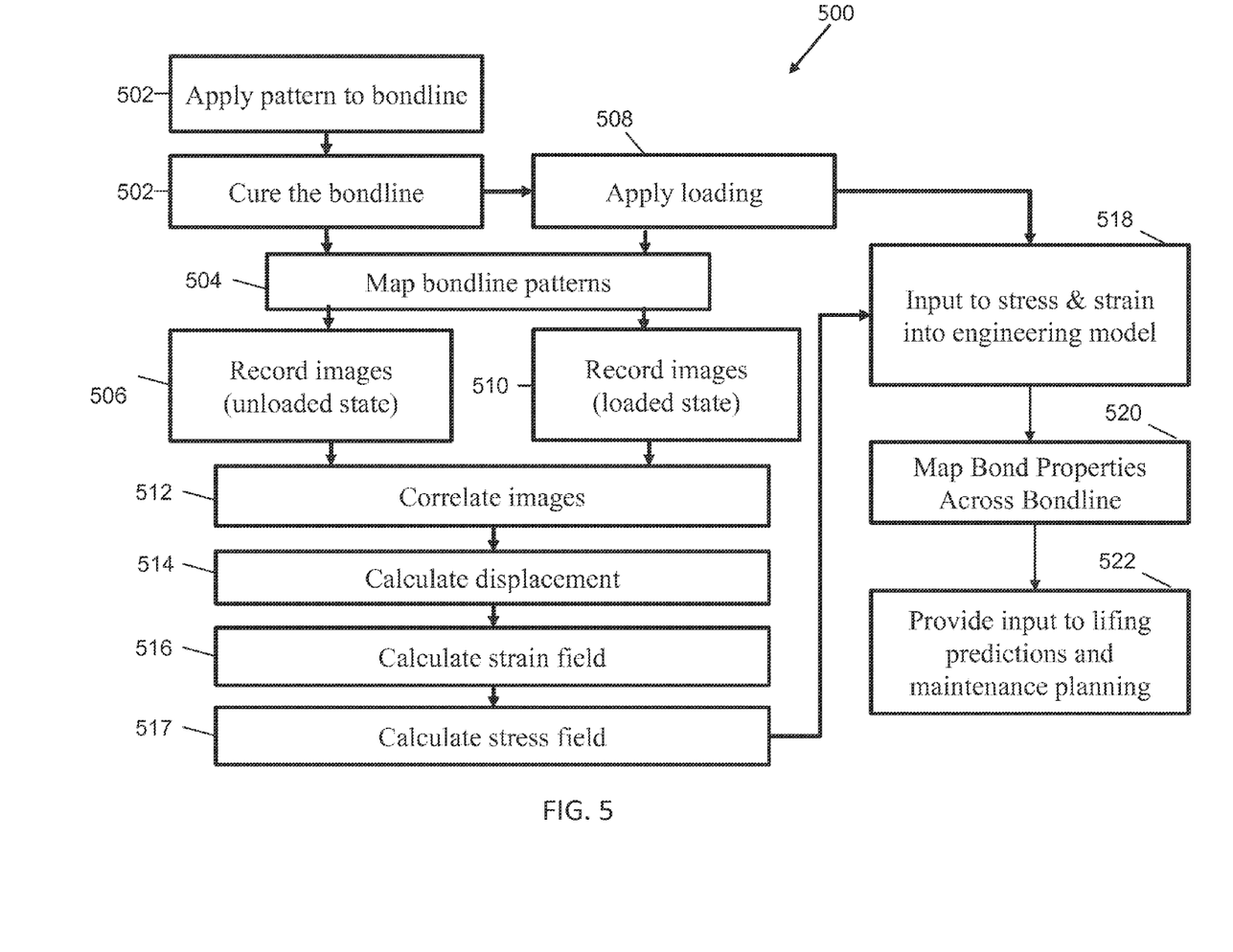
FIG. 5 is a flowchart of an example process for analyzing the stress/strain field of the bondline in the structure and providing input to lifing predictions and maintenance planning shown in FIG. 1.

FIG. 5 is a flowchart of an example process 500 for analyzing bondline 112. Initially, a manufacturer or assembler applies 502 a pattern (e.g., first pattern 118 and/or second pattern 120) to bondline 112. More specifically, in some implementations, a manufacturer of adhesive 113 includes materials having differing reflectivity into adhesive 113. In other implementations, a manufacturer or assembler of structure 106 applies the pattern (e.g., first pattern 118 and/or second pattern 120) to a surface (e.g., first side 114 and/or second side 116) of bondline 112, for example by spraying or spackling materials, or applying a scrim (e.g., first scrim 119 and/or second scrim 121) to bondline 112 (e.g., adhesive 113). Next, the assembler or manufacturer cures bondline 112. Additionally, analysis computing device 102 maps 504 patterns (e.g., first pattern 118 and/or second pattern 120) associated with bondline 112, and records 506 images of bondline 112, for example first internal images 302, in memory 410. Next, the manufacturer or assembler applies 508 a mechanical and/or thermal load to structure 106.

Analysis computing device 102 then maps 504 patterns (e.g., first pattern 118 and/or second pattern 120) associated with bondline 112, and records 510 images of bondline 112, for example second internal images 304, in memory 410. Next, analysis computing device 102 correlates 512 (e.g., compares) the images (e.g., first internal images 302 and second internal images 304), calculates 514 displacements (i.e., deformations) in the patterns (e.g., first pattern 118 and/or second pattern 120) between the pre-loaded state (e.g., first internal images 302) and the loaded state (e.g., second internal images 304). Additionally, analysis computing device 102 calculates 516 a strain field based on the displacements. Additionally, analysis computing device 102 calculates 517 a stress field based on the calculated strain field from 516 in the bondline. Additionally, analysis computing device 102 inputs 518 stress and strain information into an engineering model associated with structure 106. Additionally, analysis computing device 102 maps 520 properties of the bond along bondline 112 (i.e., for each of a plurality of locations along bondline 112) that can be correlated to strain, such as disbond, "kissing" bond, degraded or failed adhesive. Additionally, analysis computing device 102 provides 522 the mapped properties along bondline 112 to a lifing prediction and maintenance planning model (e.g., one or more S-N curves) and predicts a lifetime for bondline 112 and/or a schedule of one or more maintenance periods for bondline 112.

Figure 6:
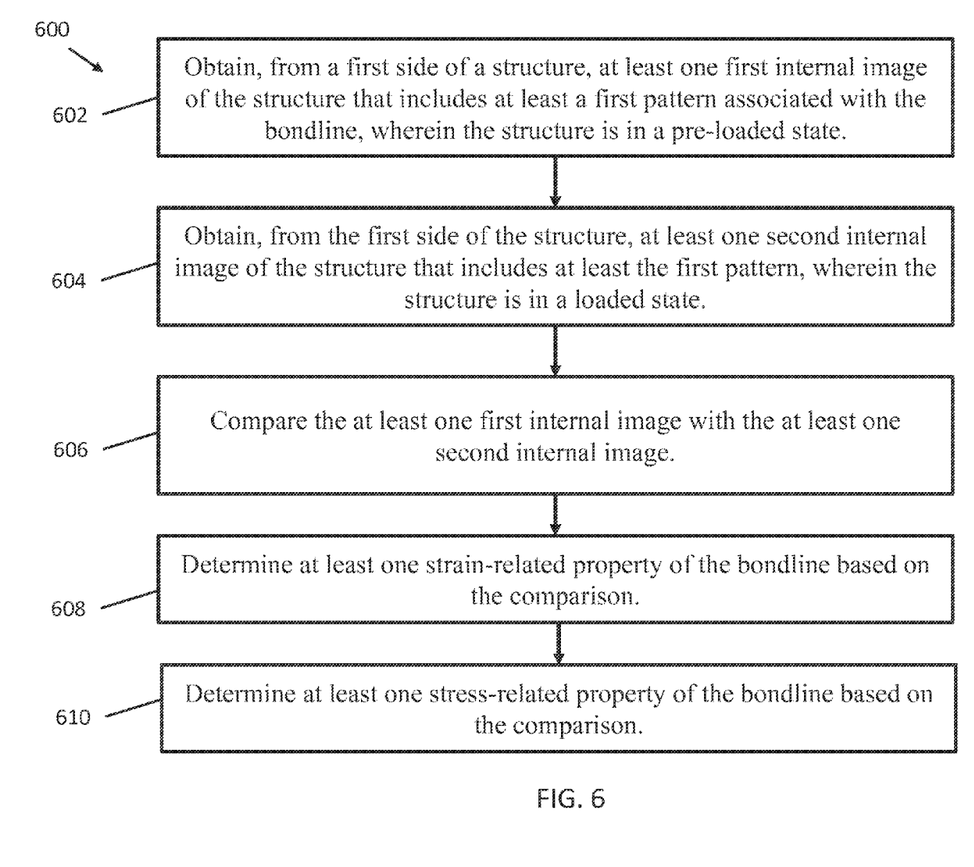
FIG. 6 is a flowchart of an example process carried out by the analysis computing device of FIG. 1 for analyzing the stress/strain property of the bondline in the structure shown in FIG. 1.

FIG. 6 is a flowchart of an example process 600 carried out by analysis computing device 102 for analyzing bondline 112. When structure 106 is in a pre-loaded state, analysis computing device 102 obtains 602, from first side 114 of structure 106, for example from image data 138, at least one first internal image (e.g., first internal images 302) of structure 106. As used herein, "pre-loaded state" does not mean that the bondline or structure is completely unstressed. Rather, "pre-loaded state" means that a particular load used for testing has not been applied to the bond or structure yet. Accordingly, "loaded state" means that the load used for testing has been applied. The at least one first internal image 302 includes at least a first pattern (e.g., first pattern 118) associated with bondline 112. Next, when structure 106 is in a loaded state (e.g., mechanical loading and/or thermal loading has been applied), analysis computing device 102 obtains 604, from first side 114 of structure 106, at least one second internal image (e.g., second internal images 304) of structure 106. The at least one second internal image 304 includes at least the first pattern (e.g., first pattern 118). Next, analysis computing device 102 compares 606 the at least one first internal image 302 with the at least one second internal image 304. For example, analysis computing device 102 calculates and measures displacements in first pattern 118 between first internal images 302 and second internal images 304. Next, analysis computing device 102 determines 608 at least one strain-related property of bondline 112 based on the comparison. Next, analysis computing device 102 determines 610 at least one stress-related property of bondline 112 based on 608. For example, at least one stress/strain-related property may be a plurality of local stress/strain-related variations of bondline 112. In at least some implementations, the variations are correlated to such stress/strain-related properties as disbonds, "kissing" or zero strength bonds, or adhesive degradation or failure.

In some implementations, process 600 additionally includes applying first pattern 118 to bondline 112 prior to generating at least one first internal image 302. In some implementations, process 600 includes applying first pattern 118 to first side 114 of bondline 112 and applying second pattern 120 to second side 116 of bondline 112, prior to obtaining at least one first internal image 302. In some implementations, process 600 additionally includes generating at least one first internal image 302 of structure 106 that includes at least first pattern 118 and second pattern 120 when structure 106 is in the pre-loaded state and generating at least one second internal image 304 of structure 106 that includes at least first pattern 118 and second pattern 120 when structure 106 is in the loaded state. In some implementations, obtaining at least one first internal image 302 further includes generating at least one first internal image 302 using an ultrasonic array 144.

In some implementations, obtaining at least one first internal image 302 further includes generating at least one first internal image 302 using backscattered electromagnetic radiation 142. In some implementations, obtaining at least one first internal image further includes generating a plurality of first internal images 302, wherein each of the first internal images 302 is associated with a different angle. In some implementations, obtaining at least one second internal image 304 further includes generating a plurality of second internal images 304, wherein each of the second internal images 304 is associated with a different angle. In some implementations, determining a strain-related property of bondline 112 further includes determining a respective strain-related property associated with each of a plurality of locations (e.g., locations 122, 124, 126, 128, 130, 132, and 134) along bondline 112.

In some implementations, process 600 additionally includes determining a predicted lifetime of bondline 112 based at least in part on the comparison of first internal images 302 to the second internal images 304. Some implementations include transitioning structure 106 from the pre-loaded state to the loaded state by applying a load (e.g., a mechanical load and/or a thermal load) to structure 106. In some implementations, process 600 includes making one or more lower strain measurements, for example to detect disbonds, kissing bonds, and/or adhesive degradation), and making higher strain measurements that produce a proof test at the level of stress applied to the structure to verify bond strength.

A technical effect of systems and methods described herein includes at least one of: (a) obtaining, from a first side of a structure, by at least one computing device, at least one first internal image of the structure that includes at least a first pattern associated with a bondline, wherein the structure is in a pre-loaded state; (b) obtaining, from the first side of the structure, by the at least one computing device, at least one second internal image of the structure that includes at least the first pattern, wherein the structure is in a loaded state; (c) comparing, by the at least one computing device, the at least one first internal image with the at least one second internal image; (d) determining, by the at least one computing device, at least one stress/strain-related property of the bondline based on the comparison; and (e) predicting an estimated life of the bondline, whereby the estimated life provides a valuable tool for optimization of maintenance effort and enabling cost-optimal maintenance decisions.

As compared to known methods and systems for analyzing a structure using digital image correlation (DIC), the methods and systems described herein enable portions of a structure that are not detectable using visible light to be analyzed using digital image correlation from a single side of the structure. Accordingly, components included within structures, such as bondlines within composite structures, may be analyzed without damaging the structure to determine at least one strain-related property and/or predicted performance of the components.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for analyzing a bondline in a structure, the method is implemented by at least one computing device, the method comprising:
   obtaining, from a first side of the structure, by the at least one computing device, at least one first internal image of the structure that includes at least a first pattern associated with the bondline and disposed internally within the structure, wherein the structure is in a pre-loaded state;
   obtaining, from the first side of the structure, by the at least one computing device, at least one second internal image of the structure that includes at least the first pattern, wherein the structure is in a loaded state, wherein the first internal image and the second internal image are actual images of the structure in the pre-loaded state and the loaded state, respectively;
   comparing, by the at least one computing device, the at least one first internal image with the at least one second internal image;
   determining, by the at least one computing device, at least one stress-related property or at least one strain-related property of the bondline based on the comparison; and
   predicting an estimated life of the bondline, whereby the estimated life provides a valuable tool for optimization of maintenance effort.

2. The method of claim 1, further comprising applying the first pattern to the bondline prior to generating the at least one first internal image.

3. The method of claim 1, further comprising, prior to obtaining the at least one first internal image:
   applying the first pattern to the first side of the bondline; and
   applying a second pattern to a second side of the bondline.

4. The method of claim 3, wherein obtaining the at least one first internal image further comprises generating at least one first internal image of the structure that includes at least the first pattern and the second pattern when the structure is in the pre-loaded state; and
   obtaining the at least one second internal image further comprises generating at least one second internal image of the structure that includes at least the first pattern and the second pattern when the structure is in the loaded state.

5. The method of claim 1, wherein obtaining the at least one first internal image further comprises generating the at least one first internal image using an ultrasonic array.

6. The method of claim 1, wherein obtaining the at least one first internal image further comprises generating the at least one first internal image using backscattered electromagnetic radiation.

7. The method of claim 1, wherein obtaining at least one first internal image further comprises generating a plurality of first internal images, wherein each of the first internal images is associated with a different angle.

8. The method of claim 1, wherein obtaining at least one second internal image further comprises generating a plurality of second internal images, wherein each of the second internal images is associated with a different angle.

9. The method of claim 1, wherein determining at least one stress-related property or at least one strain-related property of the bondline further comprises determining a respective stress or strain-related property associated with each of a plurality of locations along the bondline.

10. The method of claim 1, further comprising transitioning the structure from the pre-loaded state to the loaded state by applying a load to the structure.

11. A computing device for use in analyzing a bondline in a structure, said computing device configured to:
   obtain, from a first side of the structure, at least one first internal image of the structure that includes at least a first pattern associated with the bondline and disposed internally within the structure, wherein the structure is in a pre-loaded state;
   obtain, from the first side of the structure, at least one second internal image of the structure that includes at least the first pattern, wherein the structure is in a loaded state, wherein the first internal image and the second internal image are actual images of the structure in the pre-loaded state and the loaded state, respectively;
   compare the at least one first internal image with the at least one second internal image; and
   determine at least one stress-related property or at least one strain-related property of the bondline based on the comparison.

12. The computing device of claim 11, further configured to:
   obtain the at least one first internal image by generating at least one first internal image of the structure that includes at least the first pattern and a second pattern when the structure is in the pre-loaded state; and
   obtain the at least one second internal image by generating at least one second internal image of the structure that includes at least the first pattern and the second pattern when the structure is in the loaded state.

13. The computing device of claim 11, further configured to generate the at least one first internal image using an ultrasonic array.

14. The computing device of claim 11, further configured to generate the at least one first internal image using backscattered electromagnetic radiation.

15. The computing device of claim 11, further configured to generate a plurality of first internal images, wherein each of the first internal images is associated with a different angle.

16. The computing device of claim 11, further configured to determine a respective stress or strain-related properties associated with each of a plurality of locations along the bondline.

17. The computing device of claim 11, further configured to determine a predicted lifetime of the bondline based at least in part on the comparison.

18. A non-transitory computer-readable storage medium having computer-executable instructions embodied thereon for configuring a computing device to analyze a bondline in a structure, wherein when executed by the computing device, the computer-executable instructions cause the computing device to:
   obtain, from a first side of the structure, at least one first internal image of the structure that includes at least a first pattern associated with the bondline and disposed internally within the structure, wherein the structure is in a pre-loaded state;
   obtain, from the first side of the structure, at least one second internal image of the structure that includes at least the first pattern, wherein the structure is in a loaded state, wherein the first internal image and the second internal image are actual images of the structure in the pre-loaded state and the loaded state, respectively;
   compare the at least one first internal image with the at least one second internal image; and
   determine at least one stress-related property or at least one strain-related property of the bondline based on the comparison.

19. The non-transitory computer-readable storage medium of claim 18, wherein said computer-executable instructions additionally cause the computing device to determine a respective stress and/or strain-related property associated with each of a plurality of locations along the bondline.

20. The non-transitory computer-readable storage medium of claim 19, wherein said computer-executable instructions additionally cause the computing device to determine a predicted lifetime of the bondline based at least in part on the comparison.

* * * * *